United States Patent [19]

Krieger

[11] 4,143,277
[45] Mar. 6, 1979

[54] BEARING SUPPORT FOR RECEIVING USED FUEL ELEMENTS OF NUCLEAR POWER STATIONS

[75] Inventor: Friedrich Krieger, Würzburg, Fed. Rep. of Germany

[73] Assignee: Firma GG. Noell GmbH, Fed. Rep. of Germany

[21] Appl. No.: 822,922

[22] Filed: Aug. 8, 1977

[51] Int. Cl.² ............................................. G21F 5/00
[52] U.S. Cl. ..................................... 250/507; 250/506
[58] Field of Search ............... 250/506, 507, 515, 518; 176/87, 73, DIG. 2

[56] References Cited

U.S. PATENT DOCUMENTS

| | | | |
|---|---|---|---|
| 4,006,362 | 2/1977 | Mollon et al. | 250/507 |
| 4,010,375 | 3/1977 | Wachter | 250/507 |
| 4,024,406 | 5/1977 | Bevilacqua | 250/507 |
| 4,042,828 | 8/1977 | Rubinstein et al. | 176/87 |

Primary Examiner—Alfred E. Smith
Assistant Examiner—B. C. Anderson
Attorney, Agent, or Firm—McGlew and Tuttle

[57] ABSTRACT

A bearing support for receiving used fuel elements of nuclear power stations includes a plurality of chambers which have square cross-sections and each include inner and outer spaced apart walls with screening plates therebetween for screening the radiating fuel elements. Each chamber is detachably secured at its underside to a common foot plate and is held in position at its upper side by spacer elements. The outer wall comprises two equal-sided angle sheets and the inner wall comprises a closed square tube. The thickness of the outer wall is smaller than that of the inner wall and the outer walls are held in spaced relationship to each other at their upper sides by detachable bar grates.

10 Claims, 5 Drawing Figures

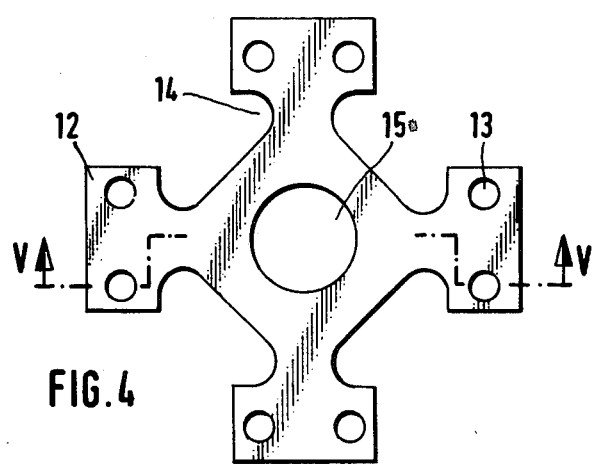
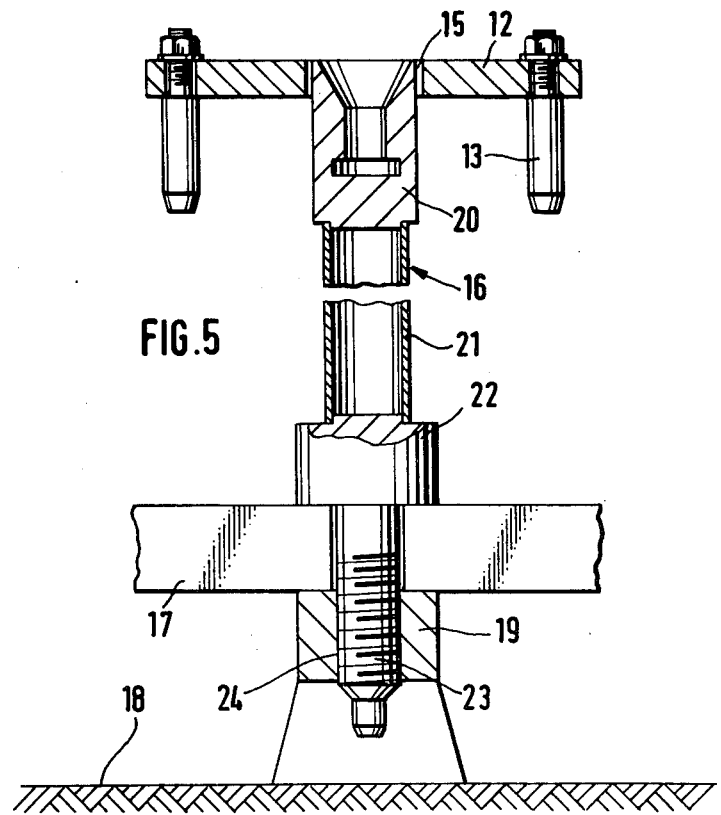

BEARING SUPPORT FOR RECEIVING USED FUEL ELEMENTS OF NUCLEAR POWER STATIONS

FIELD AND BACKGROUND OF THE INVENTION

This invention relates in general to nuclear generators and, in particular, to a new and useful bearing support for receiving used fuel elements of nuclear power stations, comprising a plurality of chambers having a square cross-section and walls formed as double shells between which plates are inserted for screening the radiating fuel elements, with each chamber being detachably secured at its underside to a common foot plate and held in position at its upper side by spacer elements.

DESCRIPTION OF THE PRIOR ART

In chambers of bearing supports of the prior art, both the outer and the inner shell comprise a closed square tube and the wall thicknesses of the tubes are equal to each other. In consequence, the screening plates must be inserted between the shells from above or below, and a satisfactory spacing must be provided between the shells and the plates, whereby, the cross-section of the double shell is increased. Further, since the plates comprising sintered boron are relatively thin (approximately 5.5 mm wide and about 4 m long) and are inserted individually on all four sides, there is a risk of breaking the plates, with the result that a uniform screening can no longer be ensured. In any case, the plates do not provide a complete screening and it is necessary to install the chambers so as to leave as large as possible a space therebetween, which space is then filled with water. The chambers in the prior art constructions are held together by a peripheral retaining band by which the spacer elements are supported at the same time. However, since the wall thicknesses of the outer and inner shells of the chambers are equal to each other and the temperature in the chamber is higher than between the chambers, high stresses are produced in the double shell which result in deformations whereby the spacing of the neighboring outer shells or walls of the chambers and the radiation screening is liable to variations.

SUMMARY OF THE INVENTION

The present invention is directed to a bearing support in which these drawbacks are avoided and the double shell or wall is designed in a manner such that the thermal stresses are eliminated, the insertion of the plates between the outer and inner walls is facilitated, and the uniform spacing of the outer shells or walls of neighboring chambers is enlarged.

For this purpose, in accordance with the invention, the outer shell comprises two equal-sided angle sheets and the inner shell comprises a closed square tube, with the wall thicknesses of the outer shell being smaller than that of the inner shell, and the outer shells of the chambers are held in spaced relationship to each other at their upper sides by a detachable bar grate.

Accordingly, it is an object of the invention to provide a bearing support for receiving used fuel elements of nuclear power stations which comprises a plurality of chambers having a square cross-section and inner and outer spaced apart walls with screening plate means for screening radiation fuel elements disposed between the walls and, wherein, each chamber is detachably secured at its underside to a common foot plate and is held in position at its upper side by spacer elements and wherein the outer wall comprises two equal-sided angle sheets and the inner wall comprises a closed square tube, the outer wall being of a thickness smaller than that of the inner wall and the chambers being held in spaced relationship to each other at their upper sides by at least one of the bar grates.

A further object of the invention is to provide a bearing support for receiving used fuel elements of nuclear power stations which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

In the Drawings:

FIG. 4 is a top plan view of a cross-plate; and

FIG. 5 is a sectional view taken along the line V—V of FIG. 4, showing an inserted rod structure for clamping the foot plates of a plurality of bearing supports together.

DESCRIPTION OF THE PREFERRED EMBODIMENT

Figure 1:
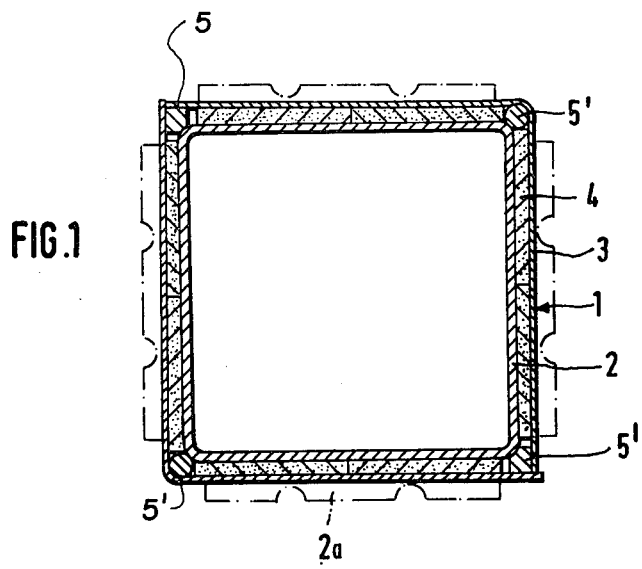
FIG. 1 is a cross-sectional view of a chamber.

Referring to the drawings in particular, the invention embodied therein, comprises a bearing support for receiving used fuel elements of nuclear power stations which includes a plurality of chambers 1 which are held together in spaced relationship and mounted above foot supports on a floor 18, as shown in FIG. 5.

To receive used fuel elements, a housing or chamber 1 is designed as a double shell or wall, with the inner wall or shell 2 formed by a closed square tube, while the outer wall or shell 3 is assembled of two equal-sided angle sheets, the wall thickness of which is smaller than that of the inner wall 2.

To screen the radiating fuel elements, a plurality of screening plates 4 are disposed between walls 2 and 3. The plates 4 have identical dimensions and are advantageously made of sintered boron.

To erect a chamber 1, plates 4 are placed on the inside surfaces of a first angle sheet forming a part of the outer shell or wall 3. Then the inner shell or wall 2 is placed on the plates and the remaining free surfaces of the exterior of the inner wall 2 are covered with plates 4. Thereupon, a second angle sheet is put in place over the remaining plates 4 and is welded, at its free ends, to the free ends of the first angle sheet. To relieve plates 4 from acting forces, it is advantageous to provide spacers 5 and 5' in the respective corners indicated. To connect and hold the chambers in spaced relationship relative to one another, the wall 2 is extended beyond wall 3 and upper end portions 2a of the sides of wall 2 are bent outwardly.

Figure 2:
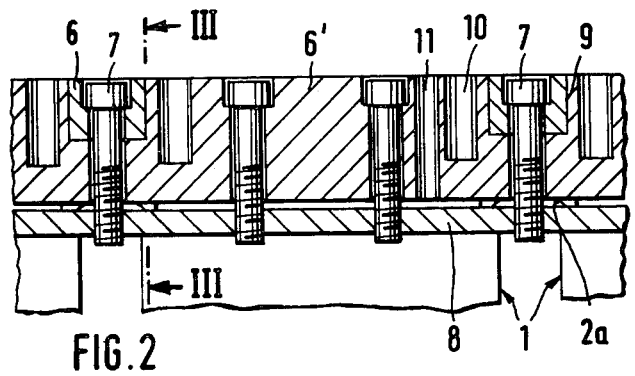
FIG. 2 is an enlarged sectional view of the upper connection of two chambers united to a bearing support.
Figure 3:
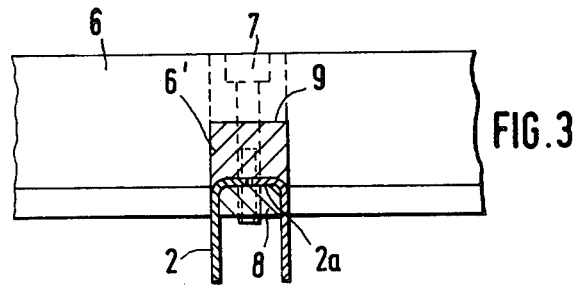
FIG. 3 is a sectional view taken along the line III—III of FIG. 2.

As shown in FIG. 2, in order to connect the individual chambers 1 at their upper side to each other and to a bearing support, end portions 2a of walls 2 are held in position by common, respective longitudinally and transversely extending grate bars 6 and 6'. To secure the grate bars 6 and 6', screws 7 are provided which extend through grate bars 6 and 6' and through end portions 2a of the inner shell at the intersections of the bars. The screws 7 also pull up a clamping strip 8 which is inserted between shells 2, beneath end portions 2a, so that end portions 2a are firmly clamped between clamping strip 8 and grate bars 6 and 6'. Grate bars 6 and 6' are provided with uniform, oppositely located recesses 9 at their intersections so that, upon connecting grate bars 6 and 6' to one another, flush upper and lower sides of the grate are obtained. The grate bars are further provided with centering holes 10 and supporting faces (not shown) for a loading machine. To enable the connection of a plurality of bearing supports of individual chambers to one another to form a unit, bores 11 are provided at the corners of the individual bearing supports for receiving a cross-plate 12, as shown in FIG. 4. The cross-plate 12 is provided with bolts 13 on its underside to be engaged in bores 11 of grate bars 6 and 6' to obtain a detachable connection, with recesses 14 to keep centering holes 10 clear, and with a central opening 15 for guiding a rod structure, generally designated 16, which serves the purpose of clamping a plurality of bearing supports together in the zone of foot plates 17.

The foot plate 17 of each individual bearing support 16 rests against a floor 18 through a plurality of vertically adjustable feet. The feet substantially absorb vertical forces so that in the occurrence of extraordinary horizontal forces, such as forces caused by an earth tremor, the bearing support is secured against tilting. This may be done so that in the corner zone of the joints of adjacent foot plates 17, a rail 19 is provided at the floor 18, on which the bearing supports to be connected to each other are placed with a small play. Then, by means of rod structure 16, which comprises an adjusting head 20, a tubular portion 21, a collar 22 and a thread bolt 23, the rails 19, which are provided with a thread 24 corresponding to thread bolt 23, are tightened against the two to four foot plates 17 to be connected to each other, whereby, the foot plates are clamped between rails 19 and collar 22.

While a specific embodiment of the invention has been shown and described in detail to illustrate the application of the principles of the invention, it will be understood that the invention may be embodied otherwise without departing from such principles.

What is claimed is:

1. A bearing support for receiving used fuel elements of nuclear power stations, comprising a plurality of chambers having a square cross-section and spaced apart inner and outer walls, screening plate means for screening the radiating fuel elements disposed between said walls, a plurality of foot plates adjacent the bottom of said chambers, a plurality of spacer elements adjacent the tops of said chambers, each chamber being detachably secured at its underside to a common foot plate and held in position at its upper side by spacer elements, said outer wall comprising two equal-sided angle sheets, said inner wall comprising a closed square tube, the wall thickness of said outer wall being smaller than that of said inner wall and a plurality of interengaged transverse and longitudinal bar grates connected to said inner walls, said inner walls of said chambers being held in spaced relationship to each other at their upper sides by at least one of said bar grates.

2. A bearing support, according to claim 1, wherein the sides of said inner walls are bent outwardly at the upper ends of said walls, and including a foot plate connected to the lower ends of said inner walls.

3. A bearing support, according to claim 1, including a plurality of transverse and longitudinally extending grate bars, each of said inner walls including an outwardly extending upper flange portion connected to said grate bars.

4. A bearing support, according to claim 3, wherein the intersections of said longitudinal and transverse grate bars are provided with uniform but oppositely located recesses for interengagement thereof.

5. A bearing support, according to claim 4, including a connecting strip underlying the flanges of said inner walls and a threaded screw extending through said grate bars at spaced locations engaging said connecting strips and securing said flange portion of said inner walls between said grate bars and said connecting strips.

6. A bearing support, according to claim 4, wherein said grate bars are provided with centering holes and supporting faces for a loading machine.

7. A bearing support, according to claim 4, wherein said grate bars are provided with a plurality of open-top bores and including a cross-plate engaged over said grate bars and having a plurality of bolts projecting downwardly therefrom into the receiving bores.

8. A bearing support, according to claim 1, including a centering rod structure for supporting four separate chamber units, including a support rail with a tubular portion supported on said rail and a cross-plate supported on said tubular portion, said chamber inner walls having flange portions adjacent the top ends thereof, a plurality of longitudinal and transverse grate bars disposed above said chambers, a connecting strip disposed between the flanges of said inner walls and means clamping said grate bars to said connecting strip with the flanges of said inner walls disposed therebetween.

9. A bearing support, according to claim 8, wherein said cross-plate has a central opening for the passage of said centering rod structure therethrough, said foot plates including a plurality of adjacent bearing supports fixed to said rail.

10. A bearing support, according to claim 9, wherein said centering rod structure includes a head portion, a tubular central portion connected to said head portion and a lower collar portion connected to said tubular portion, a foot plate connected to said collar portion and means for clamping said foot plate to said rail.

* * * * *